P. CATUCCI.
GOVERNOR BRAKE.
APPLICATION FILED APR. 26, 1917.

1,304,657.

Patented May 27, 1919.

Pliny Catucci INVENTOR.
BY
Louis M. Sanders ATTORNEY.

UNITED STATES PATENT OFFICE.

PLINY CATUCCI, OF NEWARK, NEW JERSEY, ASSIGNOR, BY MESNE ASSIGNMENTS, TO OTTO HEINEMAN PHONOGRAPH SUPPLY CO., INC., OF NEW YORK, N. Y., A CORPORATION OF NEW YORK.

GOVERNOR-BRAKE.

1,304,657.      Specification of Letters Patent.      Patented May 27, 1919.

Application filed April 26, 1917. Serial No. 164,595.

*To all whom it may concern:*

Be it known that I, PLINY CATUCCI, a citizen of the United States, residing in the city of Newark, county of Essex, and State of New Jersey, have invented new and useful Improvements in Governor-Brakes, as set forth in the following specification.

It has been the practice hitherto to provide a brake for talking machine motors wherein the braking effect is applied to the flange of the tablet support or turn table. I have found in practice that this method of braking the spring motor is objectionable, for the reason that it is in effect applying the stop to the driving spindle or mandrel, leaving the parts which are geared to said spindle and beyond the same to continue to rotate with their acquired momentum to an extent governed by the amount of play between the respective engaging gears. The governor of such spring motors is driven usually by a worm gear from the driving spindle. The worm gear is very delicate and requires to be accurately adjusted. When the braking effect is applied as above indicated, the governor weights being under a considerable momentum, will continue to oscillate to the extent permitted by the backlash in the worm gear. The ideal form of brake for such spring motors will bring the entire mechanism to a gradual stop without any oscillation of the governor weights. Governors for spring motors of this character are almost invariably provided with a sliding disk upon the governor shaft which serves as a speed regulator in connection with an adjustable brake bearing upon its face. Such a speed regulator can be adjusted to any point between maximum speed and a dead stop. However, it is not desirable to use this regulator brake as a stop. When once properly adjusted for the required speed it should be permitted to remain so. This governor brake disk however, is at the proper point at which the stop brake should be applied for stopping the motor in order to avoid the objectionable oscillation above referred to, and eliminate the strains upon the delicate gears which drive the governor.

It is the object of my invention to provide a governor brake or stop mechanism for spring motors, the same to be applied directly to the periphery of this brake disk with a lever or arm leading thereto from some convenient point on the surface of the motor board.

Figure 1:
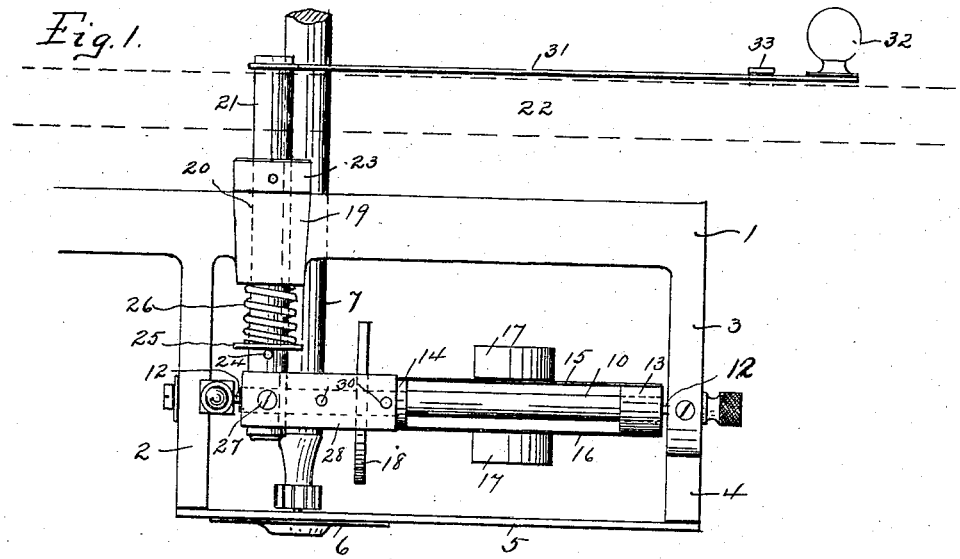

In carrying out my invention I make use of the structure described in the following specification and illustrated in the accompanying drawings wherein Figure 1, is a side elevation of so much of the well known spring motor as may be necessary to gain an understanding of my invention with my improved brake applied thereto.

Figure 2:
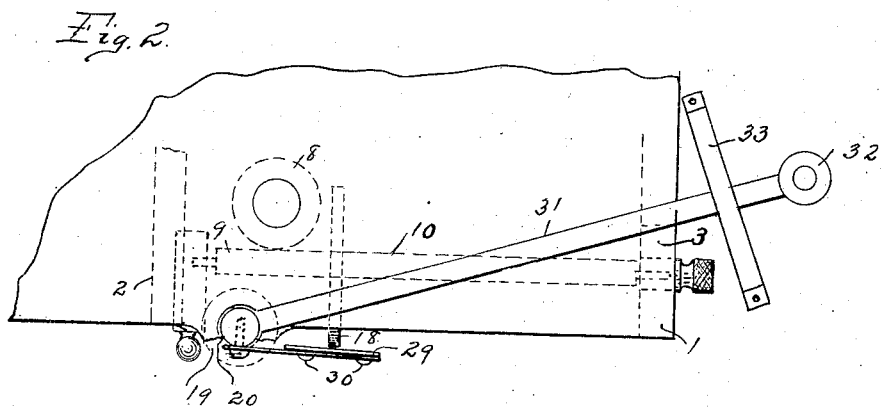

Fig. 2, is a plan view, partly broken away, of the same.

Similar reference numerals refer to like parts throughout the specification and drawings.

The motor frame 1, is of a well known type and is provided with bracket stanchions 2, 3 and 4, which serve as bearing supports for the several parts of the motor. In the present case a bridge plate 5, connects the stanchion 2, to the stanchion 4, for the purpost of affording a support for a pivot bearing 6, of the lower end of a mandrel 7, the upper end of said mandrel being located in a bearing in the upper part of the frame 1. The mandrel 7, carries a worm wheel 8, for engagement with a worm 9, upon a governor shaft 10, which is supported by pivots 12, in the bearings mounted in the stanchions 2 and 3. The governor is of the usual type used in spring motors and consists of a fixed collar 13, and a sliding collar 14, upon a shaft 10. These collars are connected by springs 15 and 16, which carry centrifugal governor weights 17, the action of which is well known. The sliding collar 14, has rigidly connected thereto and movable therewith a brake disk 18. All of these parts thus far described are well known in the art and need no further description.

In the side of the frame 1, I provide a laterally extending boss 19, having a vertical aperture 20, therein, through which extends at right angles to the governor shaft 10 a rock shaft 21, from a point slightly above the motor board 22, to a point somewhat below the axis of the governor shaft 10. Pinned to the rock shaft 21, is a collar 23, which bears upon the upper surface of the boss 19. At 24, is a horizontal pin extending diametrically through the lower part of the shaft 21, for supporting a washer 25. Between the washer 25, and the lower face of the boss 19, is located a coil spring 26, under a considerable compression. Secured to the side of the lower end of the rock shaft 21, by means of the screw 27, is a flat spring 28, which extends horizontally in the plane of the shaft 10 to a point beyond the brake disk 18, as indicated in Fig. 2. The inner face of this spring 28, is provided with a strip of leather 29, secured in place by means of rivets 30. The upper end of the rock shaft 21, has rigidly connected to it a long flat brake lever 31, having at its free end a finger knob 32, by which the rock shaft 21, may be oscillated to bring the brake leather 29, into or out of contact with the periphery of the brake disk 18. The compression spring 26, will exert a considerable frictional resistance to the free swinging of the lever 31 and the rock shaft 21, and serve to hold said lever and rock shaft in any position to which they may be moved. In practice, however, it is only necessary to swing the lever 31, through a very small angle to make the brake leather 29, effective in stopping the rotation of the governor, and consequently the entire motor. If desired I may locate a keeper 33, upon the upper face of the motor board 22, permitting the same to span the lever 31, and serving to limit its movement.

When the brake lever 31, is oscillated to bring the leather 29, in contact with the brake disk 18, the rotation of such disk is immediately arrested and there is no objectionable oscillation of the governor weights 17. This is as it should be, for there should always be a constant tension at the point of engagement of the worm gear, such tension being due to the motive power which drives the mandrel 7, and through it the governor shaft 10.

It will thus be seen that the invention provides a frictional resistance for the periphery of the governor disk, and that such resistance to be most effective should be a yielding resistance, that is, such resistance as is offered by the spring 28. It is undesirable to stop the parts instantaneously; otherwise the brake spring 28, could be omitted and a rigid lever substituted for it. The sudden stop however would be very detrimental to the accuracy of the delicate worm gear which drives the governor, and by interposing the yielding brake spring 28, into the mechanism a yielding resistance is offered at the periphery of the brake disk resulting in a gradual stop without undue strain upon the parts.

I claim:

1. In a governor brake for motors, a motor frame, a governor shaft mounted in said frame, a governor mounted on said shaft, a brake disk on said governor, a rock shaft mounted in said frame to one side of the brake disk and at right angles to the governor shaft, means for frictionally holding said rock shaft in adjusted positions in said frame, a spring brake shoe fixed to said rock shaft and projecting at right angles therefrom and in line with the governor shaft and extending beyond and overlying the periphery of the brake disk, and a lever connected to the rock shaft for operating the same to move the brake shoe into and out of engagement with the periphery of the brake disk when desired.

2. In a governor brake for motors, a motor frame, a governor shaft mounted in said frame, a governor mounted on said shaft, a brake disk on said governor, a rock shaft mounted in said frame to one side of the brake disk and at right angles to the governor shaft, a collar fixed on said rock shaft engaging one side of the frame for supporting said shaft in the frame, a coiled spring mounted on said rock shaft under tension and engaging the other side of the frame and adapted to hold said collar in engagement with the frame to thereby frictionally hold the rock shaft in adjusted positions, a spring brake shoe fixed to said rock shaft and projecting at right angles therefrom in line with the governor shaft and extending beyond and overlying the periphery of the brake disk, and a lever connected to the rock shaft for operating the same to move the brake shoe into and out of engagement with the periphery of the brake disk when desired.

PLINY CATUCCI.

Copies of this patent may be obtained for five cents each, by addressing the "Commissioner of Patents, Washington, D. C."